United States Patent
Besancenot

[11] 3,883,239
[45] May 13, 1975

[54] PHOTOGRAPHIC SLIDE-PROJECTORS

[76] Inventor: Serge Besancenot, Post of Sevran, Sevran, France

[22] Filed: May 11, 1973

[21] Appl. No.: 360,379

[30] Foreign Application Priority Data
May 29, 1972 France .............................. 72.19093

[52] U.S. Cl. .............................................. 353/118
[51] Int. Cl. ............................................ G03b 23/02
[58] Field of Search .......... 353/118, 117, 116, 114, 353/103

[56] References Cited
UNITED STATES PATENTS
| | | | |
|---|---|---|---|
| 3,055,522 | 9/1962 | Cronquist | 353/118 |
| 3,348,450 | 10/1967 | Zillmer | 353/118 |

*Primary Examiner*—Richard E. Aegerter
*Assistant Examiner*—Steven L. Stephan

[57] ABSTRACT

A photographic slide projector of the type having an optical projection system to which slides are fed one by one from a magazine and from which they are returned one by one to the magazine. The projector comprises a movable pusher slidably supporting a rigid fork which is provided with an aperture in which are releasably engagable the flexible limbs of a resilient clip carried by the pusher. When the pusher is moved towards the magazine the limbs of the clip pass into the aperture and are caused to grip a slide such that upon reverse movement of the pusher the slide is carried by the clip which in turn engages the fork at the aperture to carry the same therewith until the slide has been brought in front of the optical projection system. Thereupon the slide is halted in position and the clip releases from the slide. Continued movement of the pusher results in abutment of the fork against a stop and release of the clip from the aperture of the fork. A spring impels the fork in reverse direction and buffers attached to the fork return the slide to the magazine subsequent to its projection.

6 Claims, 6 Drawing Figures

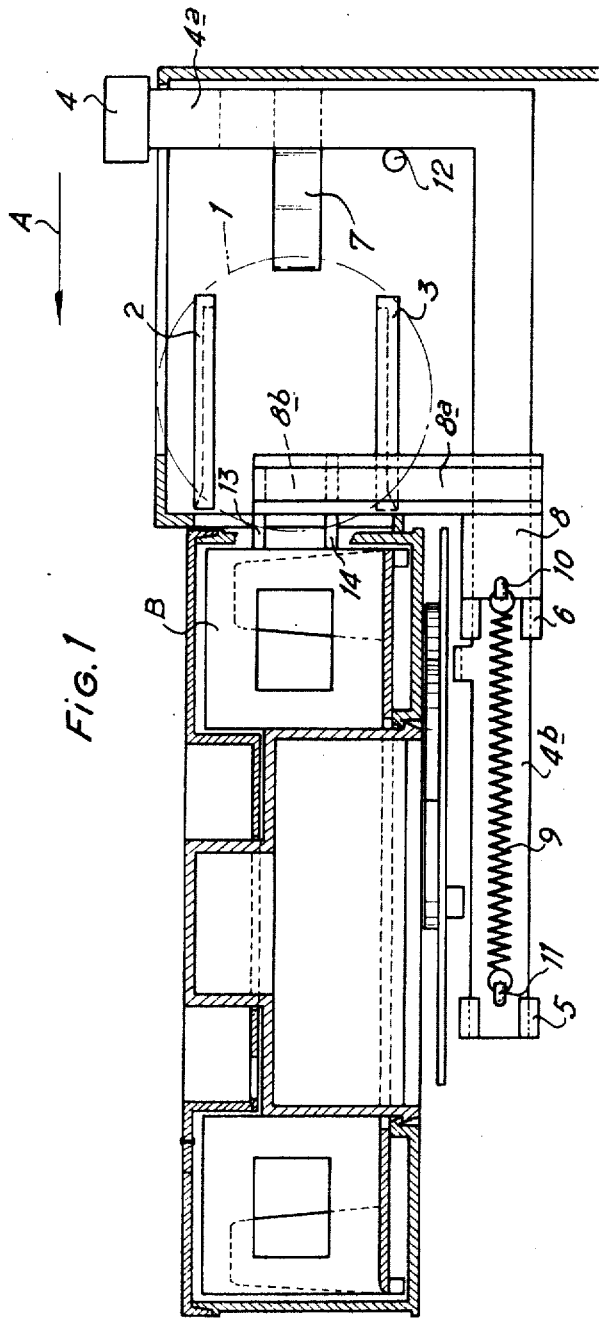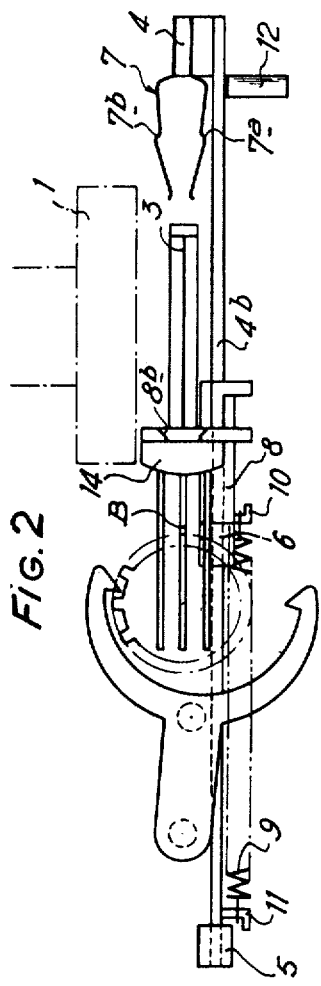

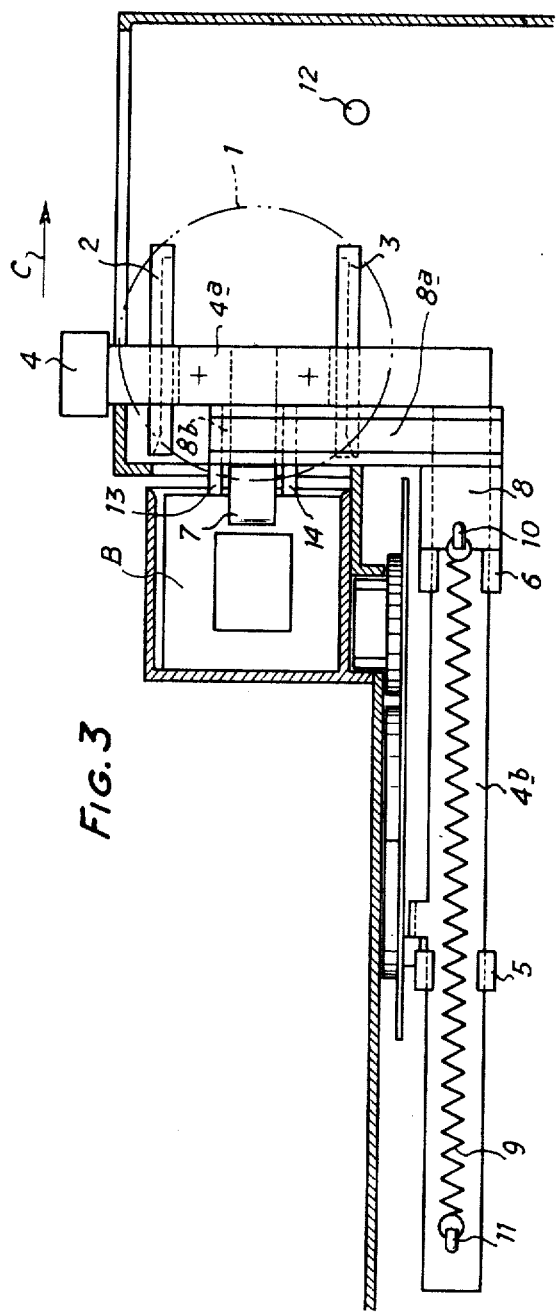
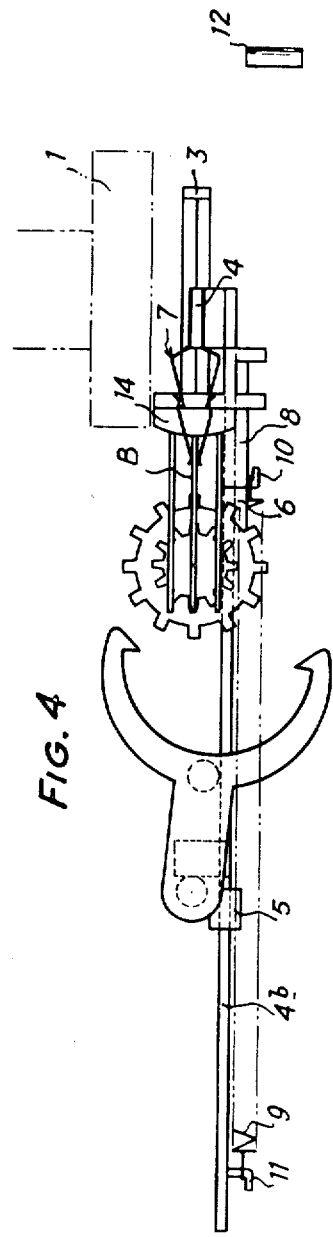

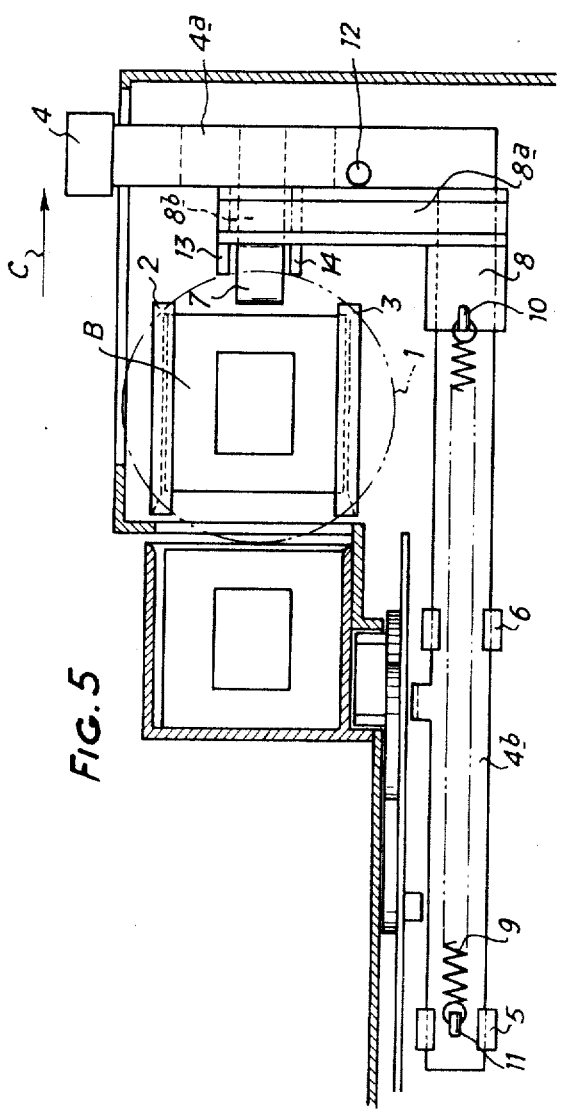
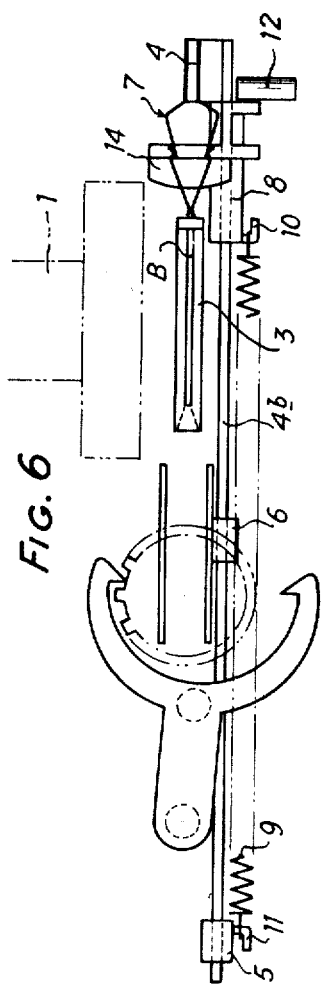

PHOTOGRAPHIC SLIDE-PROJECTORS

The present invention relates to photographic slide-projectors of the type which incorporate an optical projection system to which the slides are to be fed one by one from a magazine and from which they are also to be returned one by one to this magazine after projection. The word 'slide' is here used to denote the complete assembly of photographic transparency and the method in which it is assembled.

Up to the present, this transfer of slides has been achieved by means of a pusher with two vertical limbs, one pushing each slide out of the magazine towards the optical system, while the other limb, during the return passage, pushes the slide towards the magazine by its opposite side. This reciprocating movement of the pusher may be achieved either by manual operation or by means of a motor, thus rendering the operation comparatively automatic.

This device assumes that the photographic transparency is fixed in a relatively rigid and strong mount.

The present tendency in the field of photographic slides is to cut down their format in order to make them cheaper and less bulky.

It is, therefore, necessary to use mounts which are as thin as possible so that the slides may be stored in a more compact manner.

The thinness of the mounts implies reduced rigidity and less strength than previously. Since the actual transparencies are smaller and the mounts themselves are thinner, a very light-weight slide assembly is obtained for which known types of pushers are needlessly heavy, strong and bulky.

The present invention enables the transfer of slides to be achieved by means of a light-weight device which is inexpensive and of small bulk.

To this end, the invention consists in a photographic slide-projector of the type incorporating an optical projection system to which the slides are to be fed one by one from a magazine and from which they are to be returned one by one to the magazine by means of a movable pusher, wherein the pusher carries a clip which is able to co-operate with a slide to be projected when the latter is in the magazine so as to extract it therefrom and to feed it to the optical projection system, first means being provided to close up the clip and to hold it in this state during the forward travel of the pusher and to open the clip on or after arrival of the slide in front of the optical system, other means being provided to return the slide, once projected away, to the magazine.

The first means may be formed by a rigid fork situated in the path of the clip so that the limbs of the clip are impelled towards their closed position by the limbs of the fork when the limbs of the clip are opposite the slide to be projected, the fork being movably mounted so as to move with the clip during the return travel of the pusher, means being provided to disengage the clip from the fork at the end of this return travel.

The means for disengaging the clip from the fork may be formed by sloping shoulders provided on the outside of the flexible limbs of the clip so as to co-operate with the inner faces of the limbs of the fork, and by a stop situated in the path of the fork so as to arrest the movement of the fork while allowing that of the clip, the latter being then compelled to free itself from the fork as a result of elastic deformation of its limbs inwards, these limbs moving apart elastically after leaving the fork, means being provided to return the fork to its original position.

The means for returning the fork to its original position may be formed by a spring; one end of such spring may be connected to the fork and its other end to the pusher carrying the clip, the fork being mounted to slide on the said pusher.

The means for returning the slide once projected, to the magazine, are formed by a buffer firmly attached to the fork, the working face of which is situated in a plane which is substantially at right angles to that of the slide.

In order that the invention may be more clearly understood, reference will now be made to the accompanying drawings which show one embodiment thereof by way of example and in which:

FIG. 1 shows a schematic view of a projector according to the invention showing, partly in section, an overall view of the device in a plane at right angles to the axis of projection, FIG. 2 shows a schematic plan view of this projector shown in FIG. 1, and FIGS. 3 and 4 on the one hand, and FIGS. 5 and 6 on the other, show views also of the projector shown in FIG. 1 but in two other positions.

Referring now to the drawings, it can be seen that a projector according to the invention incorporates an optical system indicated generally and schematically at 1, on the axis of which is situated a projection aperture formed by two slide-ways 2 and 3, lying one above the other and situated in the same vertical plane.

On one side of the optical system 1 is situated a seating intended to accept a container which forms a magazine for the slides to be projected.

In the example shown, this container is circular and the slides are arranged radially in seatings provided for this purpose.

Such arrangements are well known and do not form part of the invention, but it should be pointed out that the step by step rotation of the container brings all the slides successively into line with the slide-ways 2 and 3.

In accordance with the invention, the projector incorporates a pusher 4 which has a vertical limb 4a, and a lower horizontal limb 4b which slides in fixed guides 5 and 6. To the vertical limb 4a is fixed a clip 7 formed by a suitably folded flexible strip.

A part 8 is mounted to slide on the limb 4b of the pusher 4, this part having a vertical portion 8a provided with an aperture 8b, the vertical sides of which form the limbs of a fork.

A tension spring 9 is fixed on the one hand to a hook 10 integral with the part 8 and, on the other hand, to a hook 11 integral with the limb 4b.

The limbs of the clip 7 have sloping shoulders 7a and 7b which are intended to co-operate with the vertical edges of the aperture 8b.

Furthermore, a fixed stop 12 is connected to the framework of the projector so as to be located in the path of the part 8 but not in the path of the pusher 4.

The operation of this device is as follows.

In the position in FIGS. 1 and 2, the pusher 4 is in the withdrawn position and the part 8, due to the action of the spring 9, is in the forward position, i.e. is in immediate proximity to the slides positioned in the magazine.

By moving the pusher 4 in the direction of arrow A, the clip 7 is fed towards the part 8 so that the limbs of the clip 7 pass through the aperture 8b and, as the movement continues, the clip 7 is made to close onto the mount of the slide B to be projected, due to the fact that the vertical edges of the aperture 8b are closer together than the limbs of the clip 7. The shoulders 7a and 7b co-operate with the edges of the aperture 8b so that the clip is held closed (FIGS. 3 and 4).

By then returning the pusher 4 in the direction of arrow C, the slide B, which is grasped by the clip 7, is carried along.

The slide B engages in the slide-ways 2 and 3 until it comes up against the end of these slide-ways. It then slips out of the clip 7, which continues to be moved along by the pusher 4. At this moment, the vertical portion 8a of the part 8 strikes against the stop 12 which sets up a certain amount of resistance, and the pusher must then be halted in this position (FIGS. 5 and 6). The slide B is then in the correct position in front of the optical system 1 to be projected.

To return the slide B to the container, the movement of the pusher 4 in the direction of arrow C is resumed in opposition to the resistance set up by the part 8 being arrested by the stop 12.

When this is done, the vertical edges of the aperture 8b force the clip 7 to deform elastically inwards, due to the fact that the shoulders 7a and 7b are sloping, as are also the vertical edges of the aperture 8b.

The clip 7 then comes free from the aperture 8b and since the part 8 is no longer held fast to the pusher 4, it is returned by the spring 9 to the position in FIGS. 3 and 4.

Buffers 13 and 14 are provided and above and below the aperture 8a, and are substantially at right angles to the plane of the slide B.

Since the buffers 13 and 14 are situated on the axis of the aperture 8b, they are situated opposite the slide B and, when the part 8 is returned to the position in FIGS. 1 and 2, they take with them the slide B, which thus leaves the slide-ways 3 and 4 to pass from the position in FIGS. 5 and 6 to the position in FIGS. 1 and 2.

The part 8 having regained its original position, the device is ready for a new cycle. The container is driven round for a fraction of a revolution, which corresponds to a fresh slide being brought into the position occupied by the slide B opposite the slide-ways 2 and 3.

It will be apparent that the movements of the pusher 4 may be achieved either manually or by means of a motor and, in the latter case, the motor may be synchronized with the rotation of the container to achieve entirely automatic operation of the projector, which pre-supposes, as is known, a time delay, enables the slide B to remain opposite the optical projection system for a desired length of time.

The invention is not limited to the embodiment described and shown, but, on the contrary, is susceptible to modification. In particular, the clip 7 could be made to open and close by other means than those described, for example, by using two parts in scissors connection, impelled by a spring.

Similarly, the movement of the part 8 could be achieved by some member other than the spring 9.

What I claim is:

1. A photographic slide-projector of the type incorporating an optical projection system to which the slides are to be fed by forward travel one by one from a magazine and from which they are to be returned one by one to the magazine comprising a movable pusher, a resilient clip carried by said pusher and including flexible limbs able to grip a slide to be projected when the latter is in the magazine so as to extract the slide therefrom and to feed it in front of the optical projection system, first means on said pusher having an aperture in which said limbs are insertable for closing the resilient clip to grip a slide in the clip in this state during forward travel of the pusher, and removable from said aperture for opening the clip upon arrival of the slide in front of the optical system and subsequent forward travel of the pusher beyond said slide being positioned in front of the optical system, and second means for returning the slide, after projection, to the magazine.

2. A projector as claimed in claim 1, wherein the first means comprises a rigid fork provided with said aperture, said fork being situated in the path of the clip so that the limbs of the clip are impelled towards their closed position by the fork when the limbs of the clip pass through the aperture and are opposite the slide to be projected, the fork being movable with the clip during travel of the pusher to an operative position in which the slide is in front of the optical system, and means for disengaging the clip from the fork when the clip is advanced beyond said operative position.

3. A projector as claimed in claim 2, wherein the means for disengaging the clip from the fork comprises sloping shoulders on the outside of the flexible limbs of the clip for co-operating with the inner faces of the fork at said aperture, and a stop situated in the path of the fork so as to arrest forward travel of the fork while allowing travel of the clip, which then frees itself from the fork as a result of inward elastic deformation of its limbs, said limbs moving apart elastically after having left the aperture in the fork, and means for returning the fork to its original position.

4. A projector as claimed in claim 3, wherein the means for returning the fork to its original position comprises a spring.

5. A projector as claimed in claim 4, wherein the spring has one end connected to the fork and another end connected to the pusher, said fork being slidably mounted on said pusher.

6. A projector as claimed in claim 2, wherein the means for returning the slide, after projection, to the magazine comprises a buffer rigidly attached to said fork and having a working race situated in a plane substantially at right angles to that of the slide.

* * * * *